US011664726B2

(12) United States Patent
    Li (10) Patent No.: US 11,664,726 B2
(45) Date of Patent: May 30, 2023

(54) SWITCHED CAPACITOR CONVERTER AND CONTROL METHOD

(71) Applicant: Huawei Digital Power Technologies Co., Ltd., Shenzhen (CN)

(72) Inventor: Yushan Li, Allen, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/473,309

(22) Filed: Sep. 13, 2021

(65) Prior Publication Data

US 2021/0408901 A1 Dec. 30, 2021

Related U.S. Application Data

(63) Continuation of application No. PCT/US2019/031799, filed on May 10, 2019.

(51) Int. Cl.
    *H02M 3/07* (2006.01)
    *H02M 1/00* (2006.01)

(52) U.S. Cl.
    CPC .......... *H02M 3/07* (2013.01); *H02M 1/0045* (2021.05)

(58) Field of Classification Search
    CPC .............................. H02M 3/07; H02M 1/0045
    See application file for complete search history.

(56) References Cited

U.S. PATENT DOCUMENTS

| 6,504,422 | B1 | 1/2003 | Rader et al. |
| 10,027,223 | B1* | 7/2018 | Zhang ..................... H02M 3/07 |
| 11,018,579 | B2* | 5/2021 | Jung ....................... H02M 3/07 |
| 11,258,360 | B2* | 2/2022 | Tsai ....................... H02M 3/158 |
| 2012/0326771 | A1 | 12/2012 | MacFarlane |
| 2014/0184189 | A1 | 7/2014 | Salem |
| 2016/0190921 | A1 | 6/2016 | Kumar et al. |
| 2017/0117717 | A1* | 4/2017 | Pagano ................... H02J 50/10 |
| 2019/0115829 | A1 | 4/2019 | Oporta et al. |
| 2019/0149041 | A1* | 5/2019 | Larsen ................. H04R 25/602 |
| | | | 307/151 |
| 2021/0034085 | A1* | 2/2021 | Mercer ................. H02M 3/158 |

FOREIGN PATENT DOCUMENTS

| CN | 1677817 A | 10/2005 |
| CN | 106887950 A | 6/2017 |
| WO | 2009074779 A1 | 6/2009 |
| WO | 2016140719 A2 | 9/2016 |
| WO | 2019074595 A1 | 4/2019 |

* cited by examiner

*Primary Examiner* — Sibin Chen
(74) *Attorney, Agent, or Firm* — Slater Matsil, LLP (57) ABSTRACT

A method includes configuring a switched capacitor converter to operate in a switching mode and configuring the switched capacitor converter to enter into a bypass mode after applying a charging mode to the switched capacitor converter, wherein as a result of applying the charging mode, the switched capacitor converter has a smooth transition from the switching mode to the bypass mode.

20 Claims, 3 Drawing Sheets

SWITCHED CAPACITOR CONVERTER AND CONTROL METHOD

CROSS-REFERENCE TO RELATED APPLICATIONS

This application is a continuation of Application No. PCT/US2019/031799, filed on May 10, 2019, which application is hereby incorporated herein by reference in its entirety.

TECHNICAL FIELD

The present disclosure relates to a method for controlling a switched capacitor power converter having multiple operating modes, and, in particular embodiments, to a mode transition control method for achieving a smooth mode transition in the switched capacitor power converter.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified range even when the current drawn by the electronic device may vary over a wide range. When an input voltage is lower than the specific range, a step-up dc/dc converter may be employed to convert the input voltage into a regulated voltage within the specific range. On the other hand, when the input voltage is higher than the specific range, a step-down dc/dc converter may be used to convert the voltage of the input power source into a lower voltage to satisfy the operational voltage to which the electronic circuit is specified.

There may be a variety of dc/dc conversion topologies. In accordance with the topology difference, dc/dc converters can be divided into three categories, namely, switching dc/dc converters, linear regulators and switched-capacitor converters. As integrated circuits become increasingly advanced while shrinking in size at the same time, a compact and high efficiency dc/dc conversion topology is desirable. In comparison with other topologies, the switched-capacitor converters are less complicated because the switched-capacitor converters are formed by a plurality of switches and a charge pump capacitor. In addition, the switched-capacitor converters have a small footprint and are capable of generating a high efficient power conversion by switching the charge pump capacitor between a charging phase and a discharging phase. As a result, the switched-capacitor converters can provide compact and efficient power for integrated circuits.

The switched-capacitor converters function as a 2:1 voltage divider. In some applications with an input voltage varying in a wide range, it would be desirable to configure the switched capacitor converters to operate in different operating modes, thereby efficiently reducing the output voltage variation range. The present disclosure addresses this need.

SUMMARY

These and other problems are generally solved or circumvented, and technical advantages are generally achieved, by preferred embodiments of the present disclosure which provide a control mechanism for configuring a switched capacitor power converter to operate in different operating modes. The control mechanism further helps the switched capacitor power converter achieve smooth operating mode transitions.

In accordance with an embodiment, a method comprises configuring a switched capacitor converter to operate in a switching mode and configuring the switched capacitor converter to enter into a bypass mode after applying a charging mode to the switched capacitor converter, wherein as a result of applying the charging mode, the switched capacitor converter has a smooth transition from the switching mode to the bypass mode.

The method further comprises configuring the switched capacitor converter to leave the bypass mode and enter into the switching mode after applying a discharging mode to the switched capacitor converter after leaving the bypass mode and prior to entering into the switching mode, wherein as a result of applying the discharging mode, the switched capacitor converter has a smooth transition from the bypass mode to the switching mode.

The switched capacitor converter comprises a first switch, a second switch, a third switch and a fourth switch connected in series between an input power source and ground. The switched capacitor converter further comprises a charge pump capacitor connected between a common node of the first switch and the second switch, and a common node of the third switch and the fourth switch, and an output capacitor connected to a common node of the second switch and the third switch, and ground.

In the switching mode, the switched capacitor converter functions as a voltage divider. In the bypass mode, the first switch, the second switch and the fourth switch are always on, and the third switch is always off. In the charging mode, the second switch and the fourth switch are always on, the third switch is always off, and the first switch is configured as a linear regulator with a current reference to limit a current flowing through the linear regulator. In the discharging mode, the second switch and the fourth switch are always on, and the first switch and the third switch are always off.

In the charging mode, the method comprises charging the charge pump capacitor and the output capacitor using the linear regulator until a voltage across the output capacitor is approximately equal to a voltage of the input power source. In the discharging mode, the method comprises discharging the charge pump capacitor and the output capacitor using a load connected to the output capacitor until the voltage across the output capacitor is approximately equal to one half of the voltage of the input power source.

The method further comprises receiving a command of entering into the bypass mode, entering into the charging mode to charge the charge pump capacitor and the output capacitor and entering into the bypass mode after the voltage across the output capacitor is greater than a voltage of the input power source minus a predetermined voltage.

The method further comprises receiving a command of entering into the switching mode, entering into the discharging mode to discharge the charge pump capacitor and the output capacitor and entering into the switching mode after the voltage across the output capacitor is in a range from one half of a voltage of the input power source minus a predetermined voltage to one half of the voltage of the input power source plus the predetermined voltage.

The method further comprises configuring the switched capacitor converter to leave the discharging mode and enter into the charging mode after receiving a command of entering into the bypass mode and the voltage across the output capacitor is less than a voltage of the input power source minus a predetermined voltage.

The method further comprises configuring the switched capacitor converter to leave the discharging mode and enter into the charging mode after the voltage across the output capacitor is less than one half of a voltage of the input power source minus a predetermined voltage.

The method further comprises configuring the switched capacitor converter to leave the charging mode and enter into the discharging mode after receiving a command of entering into the switching mode and the voltage across the output capacitor is greater than one half of a voltage of the input power source plus a predetermined voltage.

In accordance with another embodiment, an apparatus comprises a switched capacitor power converter comprising a plurality of switches connected in series between an input power source and ground. The switched capacitor power converter is configured to operate in four different operating modes. At least one switch is configured to operate under a current limit in one operating mode of the four different operating modes.

In accordance with yet another embodiment, a method comprises configuring a switched capacitor converter to operate in a switching mode, charging an output capacitor and a charge pump capacitor to a voltage level close to an input voltage of the switching capacitor converter and configuring the switched capacitor converter to enter into a bypass mode, wherein as a result of charging the output capacitor and the charge pump capacitor prior to entering into the bypass mode, the switched capacitor converter has a smooth transition from the switching mode to the bypass mode.

The method further comprises discharging the output capacitor and the charge pump capacitor after leaving the bypass mode and configuring the switched capacitor converter to enter into the switching mode, wherein as a result of discharging the output capacitor and the charge pump capacitor prior to entering into the switching mode, the switched capacitor converter has a smooth transition from the bypass mode to the switching mode.

An advantage of an embodiment of the present disclosure is achieving smooth operating mode transitions for a switched capacitor power converter operating in different operating modes, thereby improving the efficiency, reliability and cost of the switched capacitor power converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a switched capacitor power converter operating in different modes and having smooth mode transitions. The present disclosure may also be applied, however, to a variety of power converters having multiple operating modes. Hereinafter, various embodiments will be explained in detail with reference to the accompanying drawings.

Figure 1:
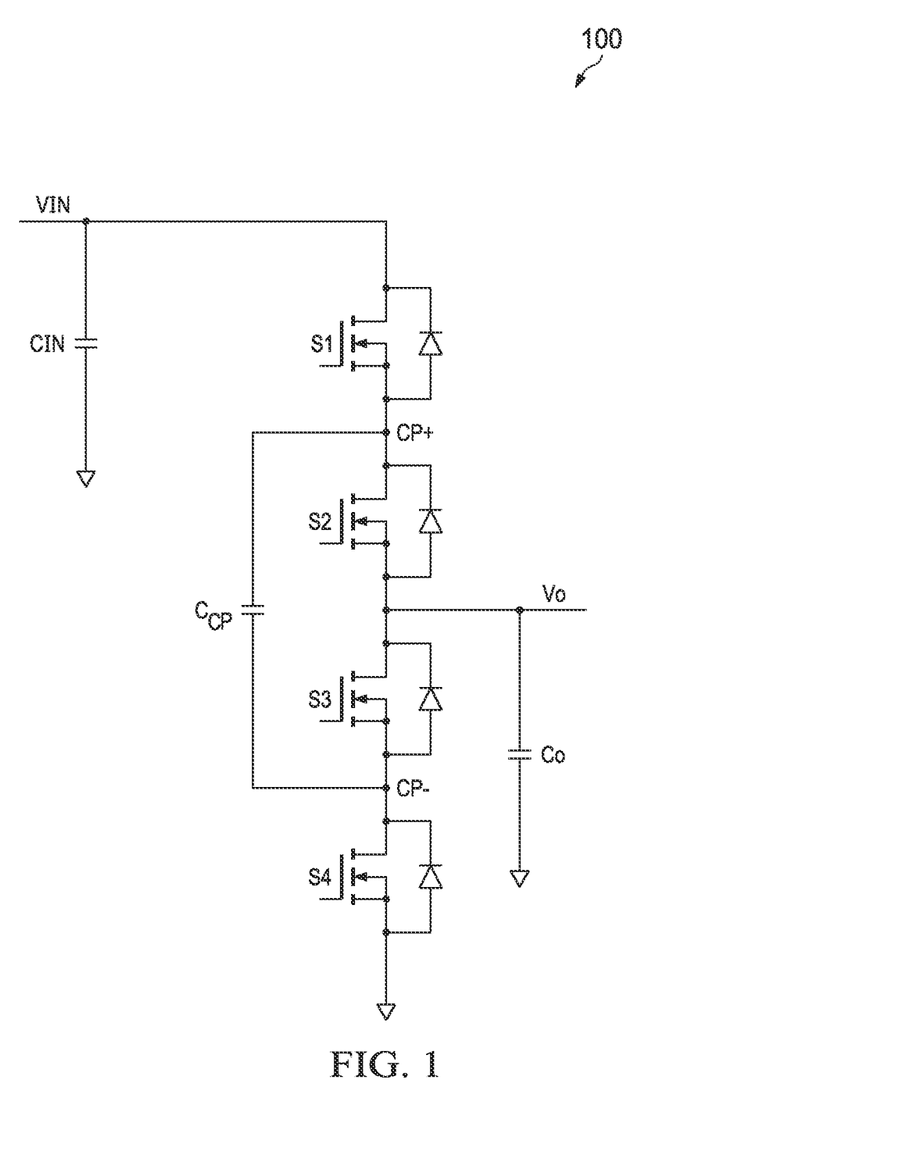
FIG. 1 illustrates a schematic diagram of a switched capacitor power converter in accordance with various embodiments of the present disclosure.

FIG. 1 illustrates a schematic diagram of a switched capacitor power converter in accordance with various embodiments of the present disclosure. The switched capacitor power converter 100 comprises an input capacitor CIN, a first switch S1, a capacitor $C_{CP}$, a second switch S2, a third switch S3, a fourth switch S4 and an output capacitor Co. The capacitor $C_{CP}$ functions as a charge pump capacitor. Throughout the description, the capacitor $C_{CP}$ may be alternatively referred to as a charge pump capacitor.

As shown in FIG. 1, the first switch S1, the capacitor $C_{CP}$ and the third switch S3 are connected in series between an input terminal VIN and an output terminal Vo. Throughout the description, the voltage at the input terminal is alternatively referred to as VIN. Likewise, the voltage at the output terminal is alternatively referred to as Vo.

A common node of the first switch S1 and the capacitor $C_{CP}$ is denoted as CP+ as shown in FIG. 1. Likewise, a common node of the third switch S3 and the capacitor $C_{CP}$ is denoted as CP−. As shown in FIG. 1, the second switch S2 is connected between CP+ and the output terminal Vo. The fourth switch S4 is connected between CP− and ground.

In accordance with an embodiment, the switches of FIG. 1 (e.g., switches S1-S4) may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted while FIG. 1 shows the switches S1-S4 are implemented as single n-type transistors, a person skilled in the art would recognize there may be many variations, modifications and alternatives. For example, depending on different applications and design needs, at least some of the switches S1-S4 may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

In operation, the input terminal VIN is connected to an input power source (not shown). The output voltage of the input power source is a dc voltage varying in a wide range. In order to control the voltage swing of the output voltage Vo, the switched capacitor power converter 100 is configured to operate in four different operating modes, namely a switching mode, a bypass mode, a charging mode and a discharging mode.

In the switching mode, the output voltage Vo is equal to one half of the input voltage VIN. In the bypass mode, the output voltage Vo is equal to the input voltage VIN. The charging mode and the discharging mode are employed to help achieve a smooth transition between the switching mode and the bypass mode.

During the transition from the switching mode to the bypass mode, the switched capacitor power converter 100 first enters into the charging mode. In the charging mode, the output capacitor is charged up to a voltage level approximately equal to the input voltage, and then the switched capacitor power converter 100 leaves the charging mode and enters into the bypass mode. Since the voltage across the output capacitor is approximately equal to the input voltage prior to entering into the bypass mode, the switched capacitor power converter 100 is able to achieve a smooth transition from the switching mode to the bypass mode.

During the transition from the bypass mode to the switching mode, the switched capacitor power converter 100 first enters into the discharging mode. In the discharging mode, the output capacitor is discharged until the voltage across the output capacitor reaches a voltage level approximately equal to one half of the input voltage, and then the switched capacitor power converter 100 leaves the discharging mode and enters into the switching mode. Since the voltage across the output capacitor is approximately equal to one half of the input voltage prior to entering into the switching mode, the switched capacitor power converter 100 is able to achieve a smooth transition from the bypass mode to the switching mode.

In the switching mode, the switched capacitor power converter 100 functions as a charge pump power converter. The charge pump power converter operates in two different phases. During the first phase of the switching mode, switches S1 and S3 are turned on, and switches S2 and S4 are turned off. Since switches S1 and S3 are turned on, a first conductive path is established between VIN and Vo. The first conductive path is formed by switch S1, the charge pump capacitor $C_{CP}$ and switch S3. The current flows from VIN to Vo through the first conductive path. During the first phase of the switching mode, the charge pump capacitor $C_{CP}$ is charged and energy is stored in the charge pump capacitor $C_{CP}$ accordingly.

During the second phase of the switching mode, switches S1 and S3 are turned off, and switches S2 and S4 are turned on. Since switches S2 and S4 are turned on, a second conductive path is established. The second conductive path is formed by switch S4, the charge pump capacitor $C_{CP}$ and switch S2. During the second phase of the switching mode, the current discharges the charge pump capacitor $C_{CP}$ and the energy stored in the charge pump capacitor $C_{CP}$ decreases accordingly.

In the switching mode, the switched capacitor power converter 100 functions as a charge pump power converter, which is a voltage divider. More particularly, by controlling the on/off time of the switches S1-S4, the output voltage of the switched capacitor power converter 100 is equal to one half of the input voltage of the switched capacitor power converter 100.

In the bypass mode, the switches S1 and S2 are always on. As a result of turning on S1 and S2, a direct conductive path is established between the input voltage VIN and the output voltage Vo. In the bypass mode, the output voltage of the switched capacitor power converter 100 is equal to the input voltage of the switched capacitor power converter 100 if the voltage drop on switches S1 and S2 is omitted.

In the bypass mode, the switch S3 is always off. The switch S4 is turned on. As a result of turning on the switch S4, the voltage across the charge pump capacitor $C_{CP}$ is equal to the output voltage Vo.

In the discharging mode, the switches S2 and S4 are always on, and the switches S1 and S3 are always off. As a result of turning on S2 and S4, and turning off S1 and S3, the charge pump capacitor $C_{CP}$ and the output capacitor Co are connected in parallel. The voltage across the parallel-connected $C_{CP}$ and Co is discharged by a load (e.g., a resistor) connected to the output of the switched capacitor power converter 100. The load keeps discharging $C_{CP}$ and Co until the voltage across the parallel-connected $C_{CP}$ and Co is approximately equal to one half of the input voltage VIN. Then, the switched capacitor power converter 100 is ready to have a transition from the discharging mode to the switching mode.

It should be noted that a current limit may be applied to the switched capacitor power converter 100 during the discharging mode. This current limit is employed to protect the switched capacitor power converter 100 from being damaged by a large discharge current.

It should further be noted that the discharging mode may be used as a power-on-reset state. In other words, during a startup process of the switched capacitor power converter 100, the switched capacitor power converter 100 first operates in the discharging mode to reset the voltage across the parallel-connected $C_{CP}$ and Co.

In the charging mode, the switches S2 and S4 are always on, and the switch S3 is always off. The switch S1 functions as a linear regulator to slowly charge the output capacitor Co and the charge pump capacitor $C_{CP}$ until the voltage across the output capacitor Co is approximately equal to VIN. In some embodiments, the charging of the output capacitor Co may be carried out through applying a current limit to the switch S1. It should be noted that the linear regulator above is a linear regulator having a current reference. Such a current reference is employed to control the current flowing through the linear regulator.

In the charging mode, after the output voltage Vo reaches a voltage level approximately equal to the input voltage VIN, the switched capacitor power converter 100 is ready to have a transition from the charging mode to the bypass mode.

Table 1 shows the operating status of each switch under the four different operating modes described above.

TABLE 1

| State | S1 | S2 | S3 | S4 |
|---|---|---|---|---|
| Switching | Switching | Switching | Switching | Switching |
| Bypass | On | On | Off | On |
| Discharging | Off | On | Off | On |
| Charging | Current Limit | On | Off | On |

As shown in Table 1, in the switching mode, switches S1-S4 keep switching. The switched capacitor power converter functions a voltage divider. In the bypass mode, switches S1, S2 and S4 are always on, and switch S3 is always off. The switched capacitor power converter provides a direct conduction path between VIN and Vo. In the discharging mode, switches S2 and S4 are always on, and switches S1 and S3 are always off. In the charging mode, switches S2 and S4 are always on, and switch S3 is always off. Switch S1 operates under a current limit.

Figure 2:
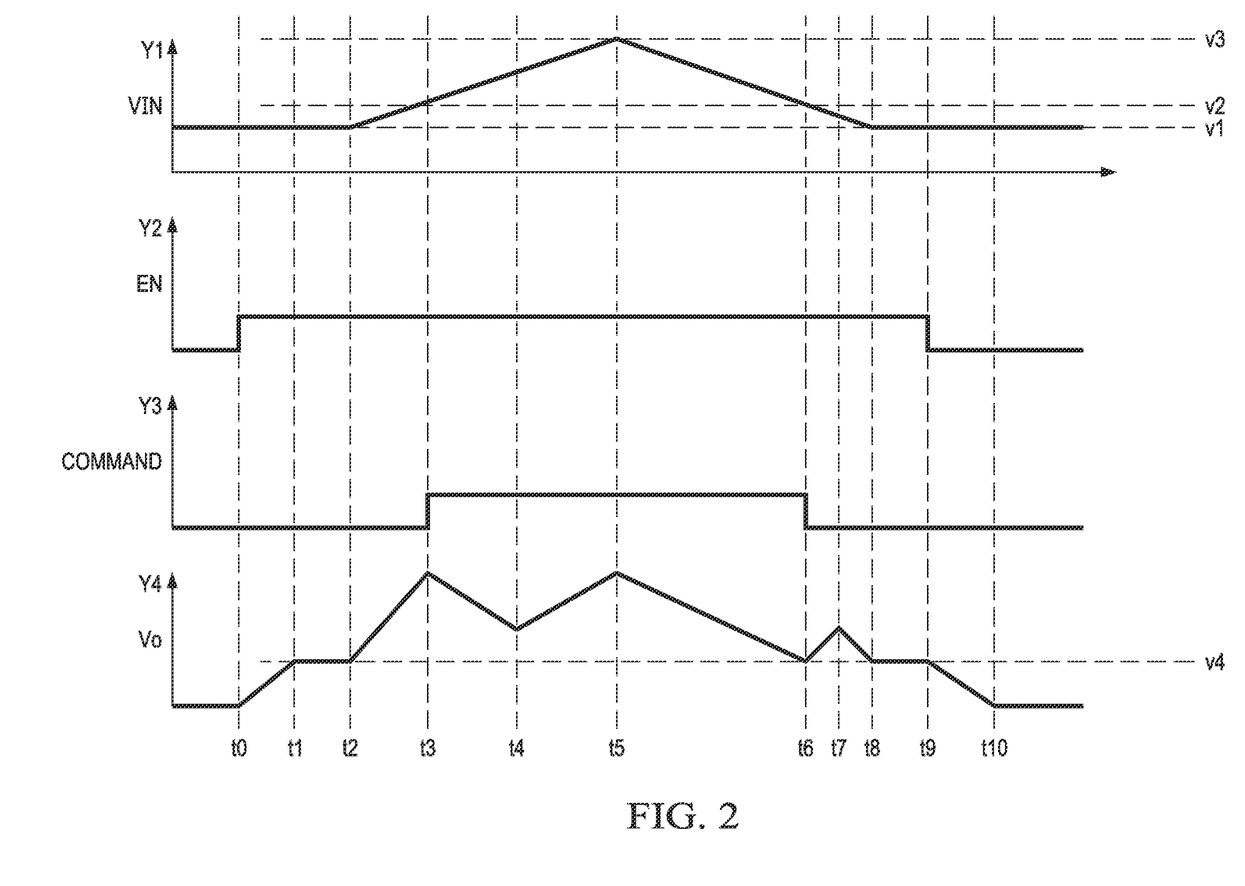
FIG. 2 illustrates a timing diagram of controlling the switched capacitor power converter operating in different operating modes in accordance with various embodiments of the present disclosure.

FIG. 2 illustrates a timing diagram of controlling the switched capacitor power converter operating in different operating modes in accordance with various embodiments of the present disclosure. The horizontal axis of FIG. 2 represents intervals of time. There may be four vertical axes. The first vertical axis Y1 represents the input voltage VIN of the switched capacitor power converter 100. The second vertical axis Y2 represents an enable signal EN. The third vertical axis Y3 represents a command of allowing the switched capacitor power converter 100 to operate in the switching mode. The fourth vertical axis Y4 represents the output voltage Vo of the switched capacitor power converter 100.

FIG. 2 shows four different voltage levels, namely V1, V2, V3 and V4. As shown in FIG. 2, the input voltage VIN varies from V1 to V3. V4 is equal to V1. In some embodiments, V1 is equal to 5 V, V2 is equal to 10 V. V3 is equal to 20 V. V4 is equal to 5 V.

It should be noted that the voltage levels used above are selected purely for demonstration purposes and are not intended to limit the various embodiments of the present disclosure to any particular voltage levels.

Prior to time instant t0, the switched capacitor power converter 100 is disabled by the enable signal EN. Although an input voltage of 5 V is applied to the switched capacitor power converter 100, the output voltage of the switched capacitor power converter 100 is equal to zero as shown in FIG. 2.

At time instant t0, the enable signal EN changes its logic state from a logic low state to a logic high state. The switched capacitor power converter 100 is enabled. As shown in FIG. 2, the switched capacitor power converter 100 operates in the charging mode from time instant t0 to time instant t1. In the charging mode, the output voltage Vo is charged to a voltage level equal to the input voltage VIN. At time instant t1, the output voltage Vo reaches a voltage level V4. V4 is equal to V1, which is the input voltage at time instant t1.

At time instant 1, the switched capacitor power converter 100 leaves the charging mode and smoothly enters into the bypass mode. From time instant t1 to time instant t3, the switched capacitor power converter 100 operates in the bypass mode. The output voltage Vo is equal to the input voltage VIN. At time instant t2, the input voltage VIN starts to increase in a linear manner. Since the switched capacitor power converter 100 operates in the bypass mode, the output voltage Vo increases accordingly as shown in FIG. 2. It should be noted if the input voltage VIN ramps up quickly, the switched capacitor power converter 100 may operate in the charging mode from time instant t2 to time instant t3.

At time instant t3, the command signal changes from a logic low state to a logic high state. As a result of this logic state change, the switched capacitor power converter 100 is allowed to operate in the switching mode from time instant t3 to time instant t6. At time instant t3, the output voltage Vo is equal to the input voltage VIN. In order to have a smooth mode transition between the bypass mode and the switching mode, the switched capacitor power converter 100 has to operate in the discharging mode first before entering into the switching mode.

At time instant t3, the switched capacitor power converter 100 leaves the bypass mode and enters into the discharging mode. From time instant t3 to time instant t4, the input voltage VIN keeps increasing. The output voltage Vo does not follow the input voltage VIN. As shown in FIG. 2, the output capacitor is discharged by the load. As a result, the output voltage Vo is reduced to a voltage level approximately equal to one half of the input voltage at time instant t4. At time instant t4, the input voltage is about 15 V. The output voltage is about 7.5 V.

At time instant t4, the switched capacitor power converter 100 enters into the switching mode. From time instant t4 to time instant t6, the switched capacitor power converter 100 operates in the switching mode. The output voltage Vo is equal to one half of the input voltage VIN. At time instant t4, the input voltage starts to increase in a linear manner. Since the switched capacitor power converter 100 operates in the switching mode, the output voltage Vo increases accordingly as shown in FIG. 2. Likewise, at time instant t5, the input voltage starts to drop in a linear manner. The output voltage drops proportionally as shown in FIG. 2.

At time instant t6, the output voltage reaches V4. The switched capacitor power converter 100 leaves the switching mode and enters into the charging mode. At time instant t7, the output voltage Vo is charged up to a voltage level approximately equal to the input voltage. In some embodiments, at time instant t7, the output voltage is equal to 7.5 V. The input voltage is equal to 7.5 V.

At time instant t7, the switched capacitor power converter 100 enters into the bypass mode. From time instant t7 to time instant t9, the switched capacitor power converter 100 operates in the bypass mode. The output voltage Vo is equal to the input voltage VIN.

At time instant t9, the enable signal EN changes its logic state from a logic high state to a logic low state. The switched capacitor power converter 100 is disabled. The output capacitor is discharged by the load. At time instant t10, the output voltage Vo reaches zero as shown in FIG. 2.

It should be noted the timing diagram shown in FIG. 2 is merely an example, which should not unduly limit the scope of the claims. One of ordinary skill in the art would recognize many variations, alternatives, and modifications. For example, the mode transition between the charging mode and the bypass mode may not happen when the output voltage Vo is equal to the input voltage VIN. Instead, the mode transition between the charging mode and the bypass mode may occur when the output voltage reaches a predetermined voltage range. The predetermined voltage range and the associated mode transitions will be described below with respect to FIG. 3.

Figure 3:
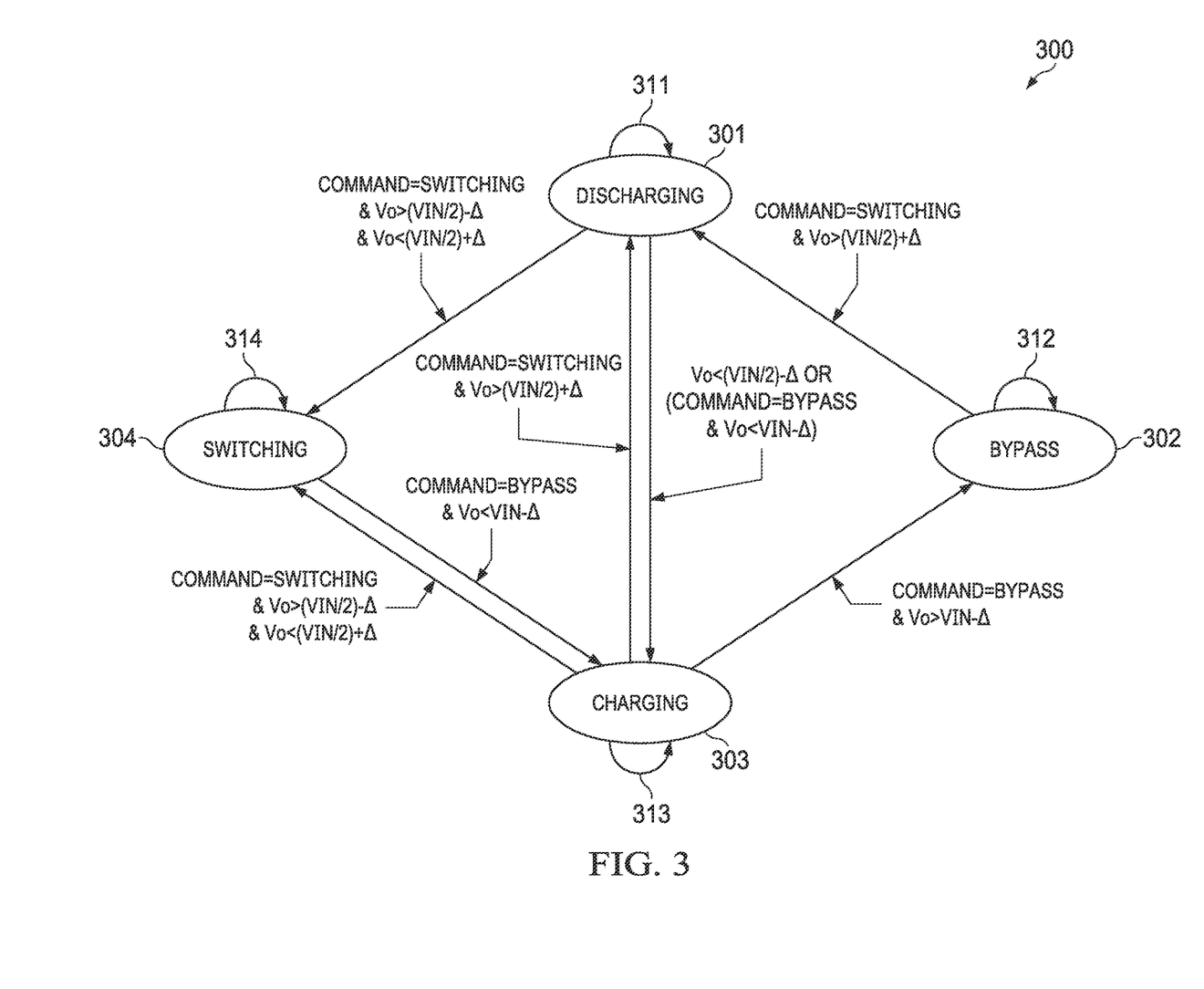
FIG. 3 illustrates a state machine for controlling the mode transition of the switched capacitor power converter shown in FIG. 1 in accordance with various embodiments of the present disclosure.

FIG. 3 illustrates a state machine for controlling the mode transition of the switched capacitor power converter shown in FIG. 1 in accordance with various embodiments of the present disclosure. The state machine 300 includes four states, namely a switching state 304, a bypass state 302, a discharging state 301 and a charging state 303. The switching state 304 corresponds to the switching mode. The bypass state 302 corresponds to the bypass mode. The discharging state 301 corresponds to the discharging mode. The charging state 303 corresponds to the charging mode.

As used herein, the designation state machine is applied to a machine which can be in one of a number of states (e.g., states 301, 302, 303 and 304), the machine being in one state at a time with the ability to change from one state to another (e.g., a transition) upon to a triggering event of condition. Such a state machine may thus be defined by its states and the triggering conditions for the transitions between two states.

According to the state machine shown in FIG. 3, an event failing to lead to a transition may be represented by a line looping over an old state as exemplified by lines 311, 312, 313, 314. Events leading to a transition from one state to another are indicated by arrows pointing to the new state starting from the old state as exemplified in FIG. 3.

State machine 300 allows state transitions between the switching state 304 and the charging state 303, from the charging state 303 to the bypass state 302, from the bypass state 302 to the discharging state 301, from the discharging state 301 to the switching state 304, and between the charging state 303 and the discharging state 301.

Depending on the input voltage and the output voltage of the switched capacitor power converter, a controller (not shown) may determine the operating mode of the switched capacitor power converter. The controller generates a command of "switching" if the switched capacitor power converter is ready for the switching mode or the switching mode is necessary. Likewise, the controller generates a command of "bypass" if the switched capacitor power converter is ready for the bypass mode or the bypass mode is necessary.

In a mode transition from the switching state 304 to the charging state 303, the transition from state 304 to state 303 is triggered if the following conditions can be satisfied: the command is "bypass" and Vo is less than Vin minus a predetermined threshold (Δ). The predetermined threshold is a predetermined voltage. In some embodiments, the predetermined voltage is a suitable voltage such as about 10% of the output voltage. In a mode transition from the charging state 303 to the switching state 304, the transition from state 303 to state 304 is triggered if the following conditions can be satisfied: the command is "switching", Vo is greater than one half of Vin (Vin/2) minus the predetermined threshold (Δ), and Vo is less than Vin/2 plus the predetermined threshold (Δ).

In a mode transition from the charging state 303 to the bypass state 302, the transition from state 303 to state 302 is triggered if the following conditions can be satisfied: the command is "bypass" and Vo is greater than Vin minus the predetermined threshold (Δ).

In a mode transition from the bypass state 302 to the discharging state 301, the transition from state 302 to state 301 is triggered if the following conditions can be satisfied: the command is "switching" and Vo is greater than Vin/2 plus the predetermined threshold (Δ).

In a mode transition from the discharging state 301 to the switching state 304, the transition from state 301 to state 304 is triggered if the following conditions can be satisfied: the command is "switching", Vo is greater than Vin/2 minus the predetermined threshold (Δ), and Vo is greater than Vin/2 minus the predetermined threshold (Δ).

In a mode transition from the discharging state 301 to the charging state 303, the transition from state 301 to state 303 is triggered if the following conditions can be satisfied: Vo is less than Vin/2 minus the predetermined threshold (Δ), or the command is "bypass" and Vo is less than Vin minus a predetermined threshold (Δ). In a mode transition from the charging state 303 to the discharging state 301, the transition from state 303 to state 301 is triggered if the following conditions can be satisfied: the command is "switching" and Vo is greater than Vin/2 plus the predetermined threshold (Δ).

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method comprising:
configuring a switched capacitor converter to operate in a switching mode, wherein the switched capacitor converter comprises a flying capacitor having a first terminal coupled to a common node of two upper switches of the switched capacitor converter, and a second terminal coupled to a common node of two lower switches of the switched capacitor converter; and
configuring the switched capacitor converter to enter into a bypass mode after applying a charging mode to the switched capacitor converter, wherein as a result of applying the charging mode, an output voltage of the switched capacitor converter is charged up to a level approximately equal to an input voltage of the switched capacitor converter prior to entering into the bypass mode, and the switched capacitor converter has a smooth transition from the switching mode to the bypass mode.

2. The method of claim 1, further comprising:
configuring the switched capacitor converter to leave the bypass mode and enter into the switching mode after applying a discharging mode to the switched capacitor converter after leaving the bypass mode and prior to entering into the switching mode, wherein as a result of applying the discharging mode, the switched capacitor converter has a smooth transition from the bypass mode to the switching mode.

3. The method of claim 2, wherein the switched capacitor converter comprises:
a first switch, a second switch, a third switch and a fourth switch connected in series between an input power source and ground;

a charge pump capacitor connected between a common node of the first switch and the second switch, and a common node of the third switch and the fourth switch, and wherein the charge pump capacitor is the flying capacitor; and an output capacitor connected to a common node of the second switch and the third switch, and ground.

4. The method of claim 3, wherein:

in the switching mode, the switched capacitor converter functions as a voltage divider;

in the bypass mode, the first switch, the second switch and the fourth switch are always on, and the third switch is always off;

in the charging mode, the second switch and the fourth switch are always on, the third switch is always off, and the first switch is configured as a linear regulator with a current reference to limit a current flowing through the linear regulator; and in the discharging mode, the second switch and the fourth switch are always on, and the first switch and the third switch are always off.

5. The method of claim 3, further comprising:

in the charging mode, charging the charge pump capacitor and the output capacitor using a linear regulator until a voltage across the output capacitor is approximately equal to a voltage of the input power source; and in the discharging mode, discharging the charge pump capacitor and the output capacitor using a load connected to the output capacitor until the voltage across the output capacitor is approximately equal to one half of the voltage of the input power source.

6. The method of claim 3, further comprising:

receiving a command of entering into the bypass mode;

entering into the charging mode to charge the charge pump capacitor and the output capacitor; and entering into the bypass mode after a voltage across the output capacitor is greater than a voltage of the input power source minus a predetermined voltage.

7. The method of claim 3, further comprising:

receiving a command of entering into the switching mode;

entering into the discharging mode to discharge the charge pump capacitor and the output capacitor; and entering into the switching mode after a voltage across the output capacitor is in a range from one half of a voltage of the input power source minus a predetermined voltage to one half of the voltage of the input power source plus the predetermined voltage.

8. The method of claim 3, further comprising:

configuring the switched capacitor converter to leave the discharging mode and enter into the charging mode after receiving a command of entering into the bypass mode and a voltage across the output capacitor is less than a voltage of the input power source minus a predetermined voltage.

9. The method of claim 3, further comprising:

configuring the switched capacitor converter to leave the discharging mode and enter into the charging mode after a voltage across the output capacitor is less than one half of a voltage of the input power source minus a predetermined voltage.

10. The method of claim 3, further comprising:

configuring the switched capacitor converter to leave the charging mode and enter into the discharging mode after receiving a command of entering into the switching mode and a voltage across the output capacitor is greater than one half of a voltage of the input power source plus a predetermined voltage.

11. An apparatus comprising:

a switched capacitor power converter comprising a plurality of switches connected in series between an input power source and ground, wherein:

the switched capacitor power converter is configured to operate in four different operating modes including a switching mode, a charging mode, a bypass mode and a discharging mode, and wherein the charging mode is applied between the switching mode and the bypass mode, and as a result of applying the charging mode, an output voltage of the switched capacitor power converter is charged up to a level approximately equal to an input voltage of the switched capacitor power converter prior to entering into the bypass mode; and at least one switch is configured to operate under a current limit in one operating mode of the four different operating modes.

12. The apparatus of claim 11, wherein the switched capacitor power converter comprises:

a first switch, a second switch, a third switch and a fourth switch connected in series between the input power source and ground;

a charge pump capacitor connected between a common node of the first switch and the second switch, and a common node of the third switch and the fourth switch; and an output capacitor connected to a common node of the second switch and the third switch, and ground.

13. The apparatus of claim 12, wherein:

the first switch is configured as a linear regulator with a current reference.

14. A method comprising:

configuring a switched capacitor converter to operate in a switching mode;

charging an output capacitor and a charge pump capacitor to a voltage level close to an input voltage of the switching capacitor converter; and configuring the switched capacitor converter to enter into a bypass mode, wherein as a result of charging the output capacitor and the charge pump capacitor prior to entering into the bypass mode, the switched capacitor converter has a smooth transition from the switching mode to the bypass mode.

15. The method of claim 14, further comprising:

discharging the output capacitor and the charge pump capacitor after leaving the bypass mode; and configuring the switched capacitor converter to enter into the switching mode, wherein as a result of discharging the output capacitor and the charge pump capacitor prior to entering into the switching mode, the switched capacitor converter has a smooth transition from the bypass mode to the switching mode.

16. The method of claim 14, wherein the switched capacitor converter comprises:

a first switch, a second switch, a third switch and a fourth switch connected in series between an input power source and ground;

the charge pump capacitor connected between a common node of the first switch and the second switch, and a common node of the third switch and the fourth switch; and the output capacitor connected between a common node of the second switch and the third switch, and ground.

17. The method of claim 16, further comprising:

configuring the first switch as a linear regulator to charge the output capacitor and the charge pump capacitor to the voltage level close to the input voltage of the switching capacitor converter.

18. The method of claim 16, further comprising:

applying a current limit to the first switch, wherein as a result of applying the current limit to the first switch, the output capacitor and the charge pump capacitor is slowly charged to the voltage level close to the input voltage of the switching capacitor converter.

19. The method of claim 16, wherein:

in the switching mode, the switched capacitor converter functions as a voltage divider, and wherein an output voltage of the switched capacitor converter is equal to one half of the input voltage; and in the bypass mode, a direct conductive path is established between the input power source and the output capacitor, and wherein the output voltage of the switched capacitor converter is equal to the input voltage.

20. The method of claim 14, further comprising:

discharging the output capacitor and the charge pump capacitor through a load resistor.

* * * * *